(12) United States Patent
Atinaja

(10) Patent No.: US 11,590,467 B2
(45) Date of Patent: Feb. 28, 2023

(54) MODULAR APPLIANCE APPARATUS CONFIGURED FOR MULTIPLE ATTACHMENTS

(71) Applicant: Columbia Insurance Company, Omaha, NE (US)

(72) Inventor: Brian Atinaja, Carol Stream, IL (US)

(73) Assignee: Columbia Insurance Company, Omaha, NE (US)

( * ) Notice: Subject to any disclaimer, the term of this patent is extended or adjusted under 35 U.S.C. 154(b) by 196 days.

(21) Appl. No.: 16/706,291

(22) Filed: Dec. 6, 2019

(65) Prior Publication Data

US 2020/0179886 A1 Jun. 11, 2020

Related U.S. Application Data

(60) Provisional application No. 62/776,252, filed on Dec. 6, 2018.

(51) Int. Cl.
*B22C 5/00* (2006.01)
*B01F 35/212* (2022.01)
*A47J 43/08* (2006.01)
*A47J 44/00* (2006.01)
*H02K 7/14* (2006.01)
*A47J 43/044* (2006.01)

(52) U.S. Cl.
CPC .......... *B01F 35/212* (2022.01); *A47J 43/044* (2013.01); *A47J 43/087* (2013.01); *A47J 44/00* (2013.01); *H02K 7/145* (2013.01); *A47J 2043/04445* (2013.01)

(58) Field of Classification Search
CPC ..................................................... H02K 7/145
See application file for complete search history.

(56) References Cited

U.S. PATENT DOCUMENTS

| 5,489,807 A | * | 2/1996 | Sanjuan | A47J 43/082 |
| | | | | 307/66 |
| D485,729 S | | 1/2004 | Patton et al. | |
| 6,719,450 B2 | * | 4/2004 | Glucksman | B01F 27/13 |
| | | | | 366/601 |

(Continued)

FOREIGN PATENT DOCUMENTS

| GB | 2469639 A | 10/2010 | |
| GB | 2546507 A | 7/2017 | |
| WO | WO-2007002180 A2 * | 1/2007 | ............. A61B 17/15 |

*Primary Examiner* — Anshu Bhatia
*Assistant Examiner* — Gregory Y Huan
(74) *Attorney, Agent, or Firm* — Thompson Coburn LLP

(57) ABSTRACT

A modular appliance apparatus is disclosed for use in the preparation of food products. The modular appliance apparatus may have a housing to contain internal components. The housing may contain a motor, a controller, and electronic circuitry. On a bottom portion of the housing, at least one base contact may be present. An attachment may secure to the bottom portion of the housing and contain at least one attachment contact. An electronic connection between the at least one base contact and at least one attachment contact may be interpreted by the controller to determine a speed of operation by the motor. Depending on the type of attachment secured to the housing, various different combinations of electronic connections may be made to operate the motor at different speeds to meet the requirements for food preparation by the specific attachment.

20 Claims, 16 Drawing Sheets

(56) References Cited

U.S. PATENT DOCUMENTS

| | | |
|---|---|---|
| 6,832,543 B2 | 12/2004 | Siano et al. |
| D644,479 S | 9/2011 | Lownds et al. |
| 8,033,712 B2 | 10/2011 | Calange |
| 8,672,250 B2 | 3/2014 | Wilson |
| D703,481 S | 4/2014 | Lownds |
| 8,985,838 B2 | 3/2015 | Hoare et al. |
| 9,572,457 B2 | 2/2017 | Ryan |
| 9,780,718 B2 | 10/2017 | Barfus et al. |
| 2002/0176320 A1 | 11/2002 | Wulf et al. |
| 2003/0141982 A1* | 7/2003 | Kim ................ A23C 20/025 340/620 |
| 2009/0213685 A1 | 8/2009 | Mak et al. |
| 2012/0199630 A1 | 8/2012 | Shelton, IV |
| 2014/0332243 A1 | 11/2014 | Baskar et al. |
| 2016/0037636 A1 | 2/2016 | Hackert et al. |
| 2018/0013374 A1 | 1/2018 | Barfus et al. |
| 2018/0178366 A1* | 6/2018 | Matei ................ B25B 21/00 |
| 2018/0178367 A1* | 6/2018 | Benson ............ A47J 43/044 |
| 2021/0298530 A1* | 9/2021 | Staun ............ A47J 43/0711 |

* cited by examiner

500

| Pin Legend | |
|---|---|
| | |
| 0000 | Motor Off |
| 0001 | Speed 1 |
| 0010 | Speed 2 |
| 0011 | Speed 3 |
| 0100 | Speed 4 |
| 0101 | Speed 5 |
| 0110 | Speed 6 |
| 0111 | Speed 7 |
| 1000 | Power Pin 1 Motor Off |
| 1001 | Power Pin 1 Speed 1 |
| 1010 | Power Pin 1 Speed 2 |
| 1011 | Power Pin 1 Speed 3 |
| 1100 | Power Pin 1 Speed 4 |
| 1101 | Power Pin 1 Speed 5 |
| 1110 | Power Pin 1 Speed 6 |
| 1111 | Motor Off |

FIG. 5

| Speed Legend (rpm) | | | |
|---|---|---|---|
| Speed | Regular | Maximum | Applications |
| Speed 1 | 50 | 150 | Slow stir / Apple Peeling |
| Speed 2 | 500 | 750 | Veggie Spiralizer, Hand Mixer, Blender Low, Potato Mashing/Ricing |
| Speed 3 | 400 | 1000 | Ice Crushing |
| Speed 4 | 1000 | 1500 | Whisk |
| Speed 5 | 4000 | 8000 | Food Processor, Blender Med-High |
| Speed 6 | 7000 | 9000 | Immersion Blender |
| Speed 7 | 12000 | 12000 | Sonic Blade, Blender High |

FIG. 6

MODULAR APPLIANCE APPARATUS CONFIGURED FOR MULTIPLE ATTACHMENTS

CROSS-REFERENCE AND PRIORITY CLAIM TO RELATED PATENT APPLICATIONS

This non-provisional patent application claims priority to U.S. provisional patent application Ser. No. 62/776,252, filed Dec. 6, 2018, and entitled "Modular Appliance Apparatus Configured for Multiple Attachments", the entire disclosure of which is incorporated herein by reference.

INTRODUCTION

Kitchen appliances come in many different forms, and most kitchen appliances are suitable only for a single use. For example, if a user wished to have an appliance for chopping nuts, the user would have to buy an individual appliance solely for the purpose of chopping nuts. If the user then wished to have an appliance for blending purposes, the nut chopper appliance would be inadequate, and the user would have to purchase another appliance solely for the purpose of blending. Further, if the user wished to have an appliance for shredding a salad, both the nut cutter and the blender would be inadequate, and the user would have to purchase another appliance for shredding salads. The number of single use designed appliances available and purchased by consumers is extremely vast. Moreover, this process of purchasing and using single use appliances becomes time consuming, expensive, and a waste of kitchen space. What is needed is a way to have one appliance that could attach to and function as multiple other appliances. Such a device would reduce the expense of multiple devices, reduce the space needed to store multiple devices, and simplify the shopping process for kitchen appliances—thereby saving consumers time.

One problem to be overcome with such a device, however, is that the speeds at which the various devices operate are drastically different. For example, peeling and mashing devices operate at low speeds that are unsuitable for tasks such as blending or whisking. Similarly, devices for blending or whisking operate at high speeds and using such devices to mash or peel could result in damage to the device, food, or the user. A variable speed device may be employed to overcome this problem, but such a device raises its own issues.

Even if the device operates at variable speeds, the large difference in speeds at which the device would have to operate would make it difficult for the consumer to select appropriate speeds themselves. Furthermore, it would be possible that the consumer would accidentally select an incorrect speed, which could lead to harm to the consumer, appliance, or the food product being prepared. As a result, what is needed is a way to have the speed selection for the multiple appliances to be preset for each device so there is no risk that the consumer causes harm to themselves, the appliance, or the food preparation process with manual speed selections. Automatically selected speeds would also simplify the consumer's experience by facilitating ease of use of the device and ensuring an optimal speed is selected for each device—which eliminates guesswork on the part of the user.

This disclosure is related to a modular appliance apparatus that overcomes these issues. The modular appliance apparatus has electrical contact points allowing the modular appliance apparatus to attach to various attachments, thereby accomplishing multiple kitchen needs. As a result, the modular appliance apparatus may connect to other apparatuses that function as the above referenced devices. Additionally, the user may grip the modular appliance apparatus and press a switch that activates the modular appliance apparatus at a set speed that corresponds to the proper operational speed of the attachment to which it is connected. When different attachments are connected via the electrical contacts, the circuitry within the modular appliance apparatus allows a microprocessor or circuitry inside the modular appliance apparatus to determine a correct functional speed for the specific attachment once the switch is activated by the user. Because of this, the user has the advantage of allowing the internal circuitry of the modular appliance apparatus to determine the optimal set for functionality of the attachment. This facilitates ease of use and improves consumer safety when using the device.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and, together with the description, serve to explain certain inventive principles. In the drawings:

FIG. 5 shows a table of various speed settings for each combination of activated controls determined by the plurality of base contacts on the modular appliance apparatus in accordance with an embodiment of the disclosure.

FIG. 6 shows a table of the different speeds for each speed setting available to the modular appliance apparatus in accordance with an embodiment of the disclosure.

DETAILED DESCRIPTION OF EXAMPLE EMBODIMENTS

Figure 1:
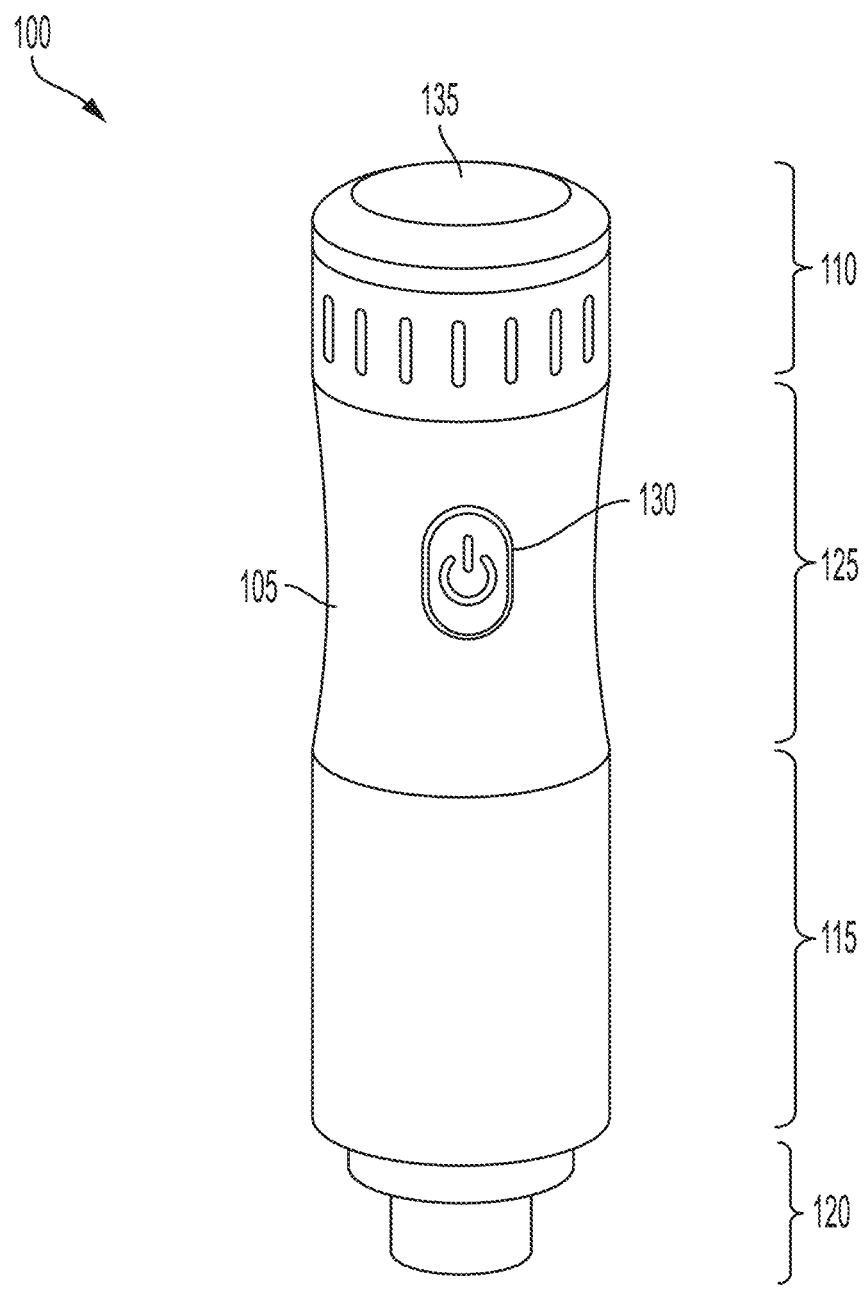
FIG. 1 illustrates an example modular appliance apparatus in accordance with an embodiment of the disclosure.

Referring to the accompanying drawings, FIG. 1 illustrates an example modular appliance apparatus 100. The modular appliance apparatus 100 shown in FIG. 1 comprises a housing 105. Within the housing 105, there may be located electronic circuitry to run the modular appliance apparatus as well as motor components. The housing 105 in FIG. 1 comprises a top end 110 and a bottom end 115. The top end 110 and the bottom end 115 of the housing 105 shown in FIG. 1 are connected by a shaft portion 125 of the housing 105. The housing 105 further comprises a power base 120. The modular appliance apparatus 100 as seen in FIG. 1 is a cordless to provide power, but it should be understood that the modular appliance apparatus 100 may be constructed with a cord attached to a power source. It should also be understood that cordless embodiments may further comprise a battery located within the housing 105, though a battery is not shown in the figures. In some embodiments, the battery may be rechargeable and permanently mounted within the housing 105. In other embodiments, however, the battery may be removable and replaceable. The housing 105 in FIG. 1 may also contain a mechanical switch 130 on its surface.

The mechanical switch 130 shown in FIG. 1 is located on the shaft portion 125 of the modular appliance apparatus 100, but the mechanical switch 130 may be located in another position on the housing 105. For example, the mechanical switch 130 may be located at a top surface 135 of the housing 105. The mechanical switch 130 shown in FIG. 1 is illustrated as a power button, but the mechanical switch 130 may be any type of mechanical switch. For example, the mechanical switch 130 may be a power knob or another type of actuating switch used to operate the modular appliance apparatus 100. In some embodiments, there may also be a speed knob (not shown) located on the shaft portion 125 of the housing 105. The speed knob can allow the user to manually adjust the speed of the modular appliance apparatus 100 to override stored operational speeds determined by the programming of the modular appliance apparatus 100.

The housing 105 shown in FIG. 1 may be comprised of any material. For example, the housing 105 may be comprised of plastic, metal, some combination of the two, or any other suitable material able to create a sufficiently rigid and strong structure of the modular appliance apparatus 100. FIG. 1 shows the housing 105 comprising a single shaft, but the power base 120 may include other portions. For example and without limitation, the power base 120 may be comprised of multiple shafts or may include a handle. The top end 110 and bottom end 115 of the housing 105 shown in FIG. 1 show the bottom end 115 having the power base 120.

Figure 2:
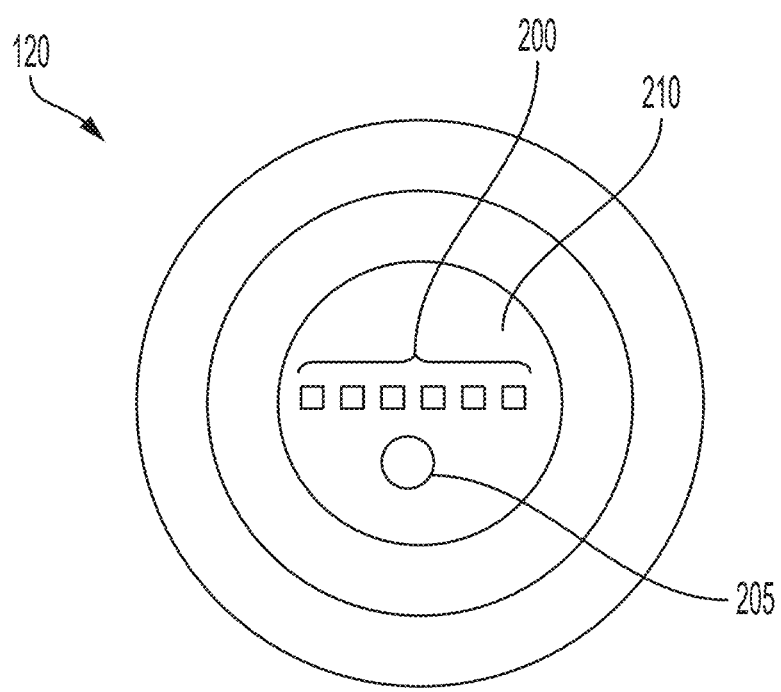
FIG. 2 illustrates a top down view of the bottom surface of an example modular appliance apparatus in accordance with an embodiment of the disclosure.

FIG. 2 illustrates a top down view of a bottom surface 210 of the power base 120 of the modular appliance apparatus 100. The bottom surface 210, located on the underside of the power base 120, may contain a plurality of base contacts 200. The plurality of base contacts 200 may connect to like contacts on an attachment to complete circuitry within the modular appliance apparatus 100, thereby powering the apparatus. Also located on the underside of the power base 120 may be a drive mechanism 205. The drive mechanism 205 may mechanically attach to a like drive coupling on the attachment at one end to drive the operation of the attachment by the modular appliance apparatus 100. At the other end, the drive mechanism 205 may attach to a drive shaft, and in turn, a motor contained within the housing 105 to drive both the modular appliance apparatus 100 and the secured attachment when power switch 130 is activated by the user.

Figure 3:
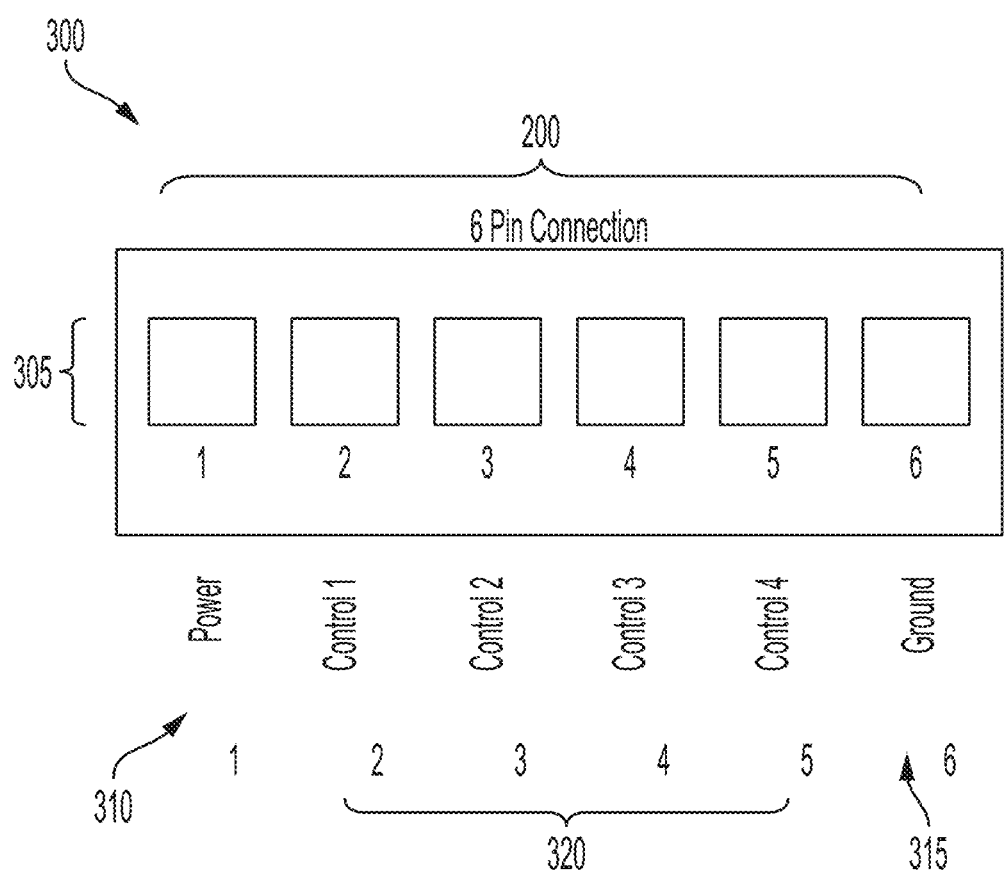
FIG. 3 illustrates an example base with a plurality of base contacts on the modular appliance apparatus in accordance with an embodiment of the disclosure.

FIG. 3 illustrates an example layout 300 of the plurality of base contacts 200 on the power base 120 of the modular appliance apparatus 100. FIG. 3 shows the plurality of base contacts 200 aligned in a single row, but the base contacts 200 may be arranged in any configuration. For example and without limitation, the base contacts 200 could be arranged in two rows of three or three rows of two. FIG. 3 also shows the base contacts 200 as having four sides in a rectangular shape 305, but the base contacts 200 may consist of any number of sides and may come in any shape. For example and without limitation, the base contacts 200 may be circular. FIG. 3 shows a row of six base contacts 200 on the power base 120, but there may be any number of base contacts 200 on the power base 120. The plurality of base contacts 200 are aligned so that one of the base contacts is connected to a source of power, a power contact 310, one of the base contacts is connected to a ground, a ground contact 315, and the other base contacts are control contacts 320 to control the operational speed of the motor.

Each control contact 320 can either be in an "on" or "off" state. When connected to a source of power, the control contacts 320 communicate their states to a controller, such as a microprocessor, located within the housing 105 of the modular appliance apparatus 100. FIG. 3 shows four control contacts 320 for a total of sixteen speed options. The different speed rates for each of the control communications are shown in greater detail with FIGS. 5 and 6. However, the amount of base contacts 200 and the rates of speed are not limited by the amounts given in FIGS. 5-6 and may be any amount desirable by the user and the number of binary combinations afforded by the number of control contacts 320. The use of the different speeds is not limited by the applications shown in FIG. 6 and may be any other suitable use.

Figure 4:
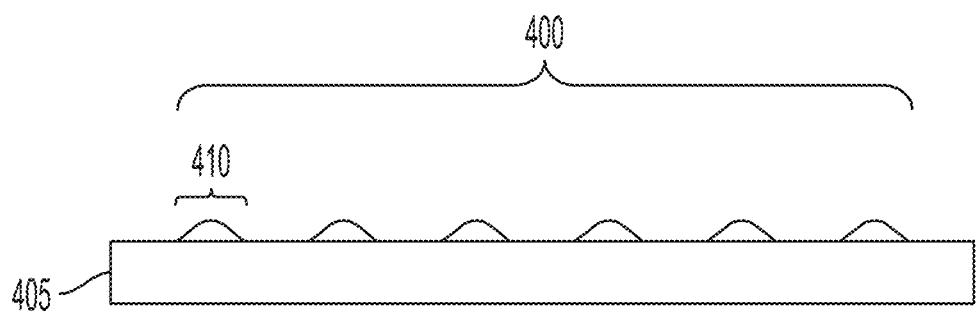
FIG. 4 illustrates an example attachment base with a plurality of attachment contacts on an attachment to be coupled to the modular appliance apparatus in accordance with an embodiment of the disclosure.

FIG. 4 illustrates an example of the layout of the plurality of attachment contacts 400 on an attachment 405 connected and in electrical communication with the power base 120 of the modular appliance apparatus 100. FIG. 4 shows the plurality of attachment contacts 400 aligned in a single row, but the attachment contacts 400 may be arranged in any configuration. For example and without limitation, the attachment contacts 400 could be arranged in two rows of three or three rows of two. FIG. 4 also shows the attachment contacts 400 being slightly raised in a semicircular configuration 410. The raised semicircular configuration can assist in ensuring electrical communication between the attachment contacts 400 and the base contacts 200 of the modular appliance apparatus 100. In addition, the attachment contacts 400 may have four sides in a rectangular shape, but the attachment contacts 400 may consist of any number of sides and may come in any shape. For example and without limitation, the attachment contacts 400 may be circular and may protrude like pogo pins to facilitate the connection to the plurality of base contacts 200. The arrangement and shape of the attachment contacts 400 on an appliance will be in accordance with the arrangement and shape of the plurality of base contacts 200 on the power base 120 of the modular appliance apparatus 100. This is to facilitate the connection to the plurality of base contacts 200.

The attachment 405 may also have a drive coupling (not shown) that can connect to the drive mechanism 205 of the modular appliance apparatus 100. The drive coupling can mate with the drive mechanism to facilitate movement of the mechanical components contained within the attachment 405. The attachment may also have a locking mechanism (not shown) which can mechanically couple the attachment to the power base 120 of the modular appliance apparatus 100 so that the attachment 405 does not dislodge or allow for disconnection of the base contacts 200 and the attachment contacts 400 when the modular appliance apparatus 100 is in use. Depending on the desired speed of the attachment 405, the attachment may have additional circuitry that connects the necessary attachment contacts 400 to the ground contact 315 thereby allowing the controller to determine the desired speed of operation by the modular appliance apparatus 100.

Turning now to FIG. 5, a reference table 500 of various speed settings for each combination of activated controls, which are determined by the plurality of base contacts in connection with the plurality of attachment contacts, can be seen. A memory may store this table of various speed settings either in the controller, such as a microprocessor, or a motor controller of the modular appliance apparatus. Based on a binary state of the control contacts 320, the processing logic may look up this reference table 500 from the memory to output the correct speed. For example, if four control contacts 320 are present, sixteen position operational states may be stored within the reference table 500 in the memory and accessed for motor speed control.

If the control contacts 320 are in electrical communication with their respective attachment contacts 400 to create a "0000" state 505, the motor of the modular appliance apparatus does not operate. The same result can be achieved if the control contacts 320 are in electrical communication with their respective attachment contacts 400 to create an "1111" state 580. Each of these states are safety mechanisms that prevent the modular appliance apparatus 100 from operating in unsafe conditions such as when an attachment is not present or if the power base 120 is in contact with a conductive surface that may inadvertently create an electronic circuit between the base contacts 200.

A first speed of operation by the modular appliance apparatus 100 can be achieved when the control contacts 320 are in electrical communication with their respective attachment contacts 400 to create a "0001" state 510. A second speed of operation by the modular appliance apparatus 100 can be achieved when the control contacts 320 are in electrical communication with their respective attachment contacts 400 to create a "0010" state 515. A third speed of operation by the modular appliance apparatus 100 can be achieved when the control contacts 320 are in electrical communication with their respective attachment contacts 400 to create a "0011" state 520. A fourth speed of operation by the modular appliance apparatus 100 can be achieved when the control contacts 320 are in electrical communication with their respective attachment contacts 400 to create a "0100" state 525. A fifth speed of operation by the modular appliance apparatus 100 can be achieved when the control contacts 320 are in electrical communication with their respective attachment contacts 400 to create a "0101" state 530. A sixth speed of operation by the modular appliance apparatus 100 can be achieved when the control contacts 320 are in electrical communication with their respective attachment contacts 400 to create a "0110" state 535. A seventh speed of operation by the modular appliance apparatus 100 can be achieved when the control contacts 320 are in electrical communication with their respective attachment contacts 400 to create a "0111" state 540.

Additionally, one of the control contacts 320 can control whether a power signal is passed from the controller, or motor power source, to the attachment 405. In this type of example, the attachment 405 may have powered components such as a timer or light that requires a power input to operate. If the power control contact is in an "on" state, power may flow to the attachment 405. For example, if the power contact is active in an "on" state but the other control contacts are "off" to create a "1000" state 545, the modular appliance apparatus 100 may not function. This is an additional safety measure to prevent unintended operation of the modular appliance apparatus 100.

A first speed of operation with power provided to the attachment 405 can be achieved when the control contacts 320 are in electrical communication with their respective attachment contacts 400 to create a "1001" state 550. A second speed of operation with power provided to the attachment 405 can be achieved when the control contacts 320 are in electrical communication with their respective attachment contacts 400 to create a "1010" state 555. A third speed of operation with power provided to the attachment 405 can be achieved when the control contacts 320 are in electrical communication with their respective attachment contacts 400 to create a "1011" state 560. A fourth speed of operation with power provided to the attachment 405 can be achieved when the control contacts 320 are in electrical communication with their respective attachment contacts 400 to create a "1100" state 565. A fifth speed of operation with power provided to the attachment 405 can be achieved when the control contacts 320 are in electrical communication with their respective attachment contacts 400 to create a "1101" state 570. A sixth speed of operation with power provided to the attachment 405 can be achieved when the control contacts 320 are in electrical communication with their respective attachment contacts 400 to create a "1110" state 575.

As viewed in FIG. 6, a speed legend 600 is provided for operation of the modular appliance apparatus. The speed legend 600 can be stored within the memory of the controller or another component of the modular appliance apparatus 100 and accessed by processing applications based on the detected state of operation determined by the connection between the base contacts 200 and the attachment contacts 400. The speed legend 600 provides a revolutions per minute speed output create by the motor and sent to a drive shaft to operate the drive mechanism 205.

The maximum and minimum number of revolutions per minute may vary for each of the associated speeds of operation of the modular appliance apparatus 100. This range of operation is acceptable for the ranges of operation needed for the intended use of the modular appliance apparatus 100 with an attachment 405 in a specific method of food preparation. For a first speed 605, the motor may output a regular revolutions per minute of 50 and a maximum revolutions per minute of 150. The first speed 605 could be used for a slow stir application of food products or a peeling operation such as peeling a fruit. For a second speed 610, the motor may output a regular revolutions per minute of 500 and a maximum revolutions per minute of 750. The second speed 610 could be used for spiralizing vegetables, for use of the modular appliance apparatus 100 as a hand mixer, a low blender setting, or for potato mashing or ricing. For a third speed 615, the motor may output a regular revolutions per minute of 400 and a maximum revolutions per minute of 1000. The third speed 615 could be used for an ice crushing operation. For a fourth speed 620, the motor may output a regular revolutions per minute of 1000 and a maximum revolutions per minute of 1500. The fourth speed 620 could be used for a whisking operation. For a fifth speed 625, the motor may output a regular revolutions per minute of 4000 and a maximum revolutions per minute of 8000. The fifth speed 625 could be used for a food processing operation or a medium to high blender operation. For a sixth speed 630, the motor may output a regular revolutions per minute of 7000 and a maximum revolutions per minute of 9000. The sixth speed 630 could be used for an immersion blender type of operation. For a seventh speed 635, the motor may output a regular revolutions per minute of 12000 and a maximum revolutions per minute of 12000. The seventh speed 635 could be used for a sonic blade operation or a high blender operation. As can be seen from the multitude of example food operations discussed above, the modular appliance apparatus 100 can be used in many different ways for a variety of food operations. It should be understood, however, that this list of food preparation operations is in no way limiting. Alternative food preparations may be made, and one of the desired speeds of the modular appliance apparatus 100 may also function for the alternative food preparation.

Figure 7:
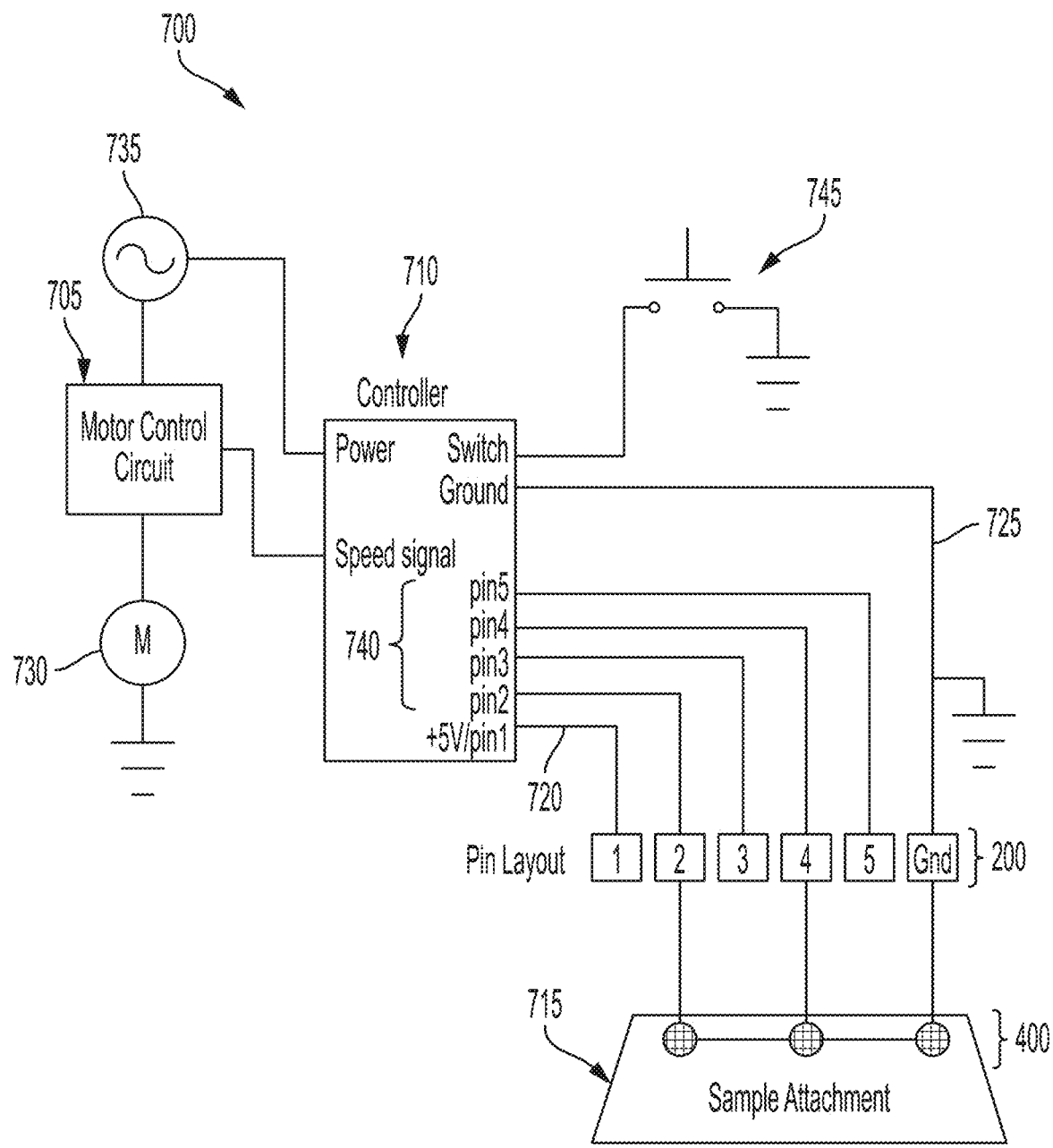
FIG. 7 shows an electrical schematic of the control circuitry for the modular appliance apparatus in accordance with an embodiment of the disclosure.

An example of the electronic circuitry 700 for the attachment-driven motor speed control is shown in FIG. 7. FIG. 7 includes a motor control circuit 705. The motor control circuit communicates with a controller 710 and is provided a speed setting from the controller 710. A motor 730 is also connected to the motor control circuit 705 to provide the speed output determined by the motor control circuit 705. A power source 735 is also provided and connected to the electronic circuitry 700 to drive the overall operation of the electronic circuitry 700. The power source 735 may provide AC power or DC power dependent on the other components of the electronic circuitry 700. Controller 710 may be a microprocessor that has a memory. The memory may store the reference table 500 and the speed legend 600. The controller 710 may also have a plurality of pins that can connect to additional components of the electronic circuitry 700. One pin of the controller 710 may connect to the power source 735 to provide power to the controller. Another pin of the controller 710 may connect to the motor control circuit 705 to provide the output speed to the motor 730 via the motor control circuit 705. Yet another pin of the controller 710 may connect to a trigger switch 745. The trigger switch 745 is activated by the user pressing the mechanical switch 130 on the housing 105 of the modular appliance apparatus 100 thereby connecting the circuit to allow a signal to pass into the controller 710. A ground pin 725 of the controller is connected to ground contact 315 of the base contacts 200. The ground pin 725 connection provides a power ground for the electronic circuitry 700. A power pin 720 is connected to a power contact 310 of the base contacts 200. The control pins 740 connect to their respective control contacts 320 of the base contacts 200.

As further seen in FIG. 7, the base contacts 200 on the power base 120 are connected to the different attachments. A sample attachment 715 is shown in FIG. 7. As opposed to the attachment 405 seen in FIG. 4, sample attachment 715 only has three attachment contacts 400 to complete the circuit. The reference table 500 gives example speed rates for the different combinations of contacts communicating an "on" state to the controller 710. In the FIG. 7 example, "on" contacts 1 and 3 (connected to pins 2 and 4) connect to the ground to complete the circuit of the sample attachment 715. This configuration sends a "1010" state 555 to the controller 710 that controls the motor speed. The motor speed for this sample attachment would be a second speed with power provided to the power pin 720 and to be used by the sample attachment 715. According to FIG. 6, the speed of the motor may be outputted at a regular revolutions per minute of 500 and a maximum revolutions per minute of 750. The second speed 610 could be used for spiralizing vegetables, for use of the modular appliance apparatus 100 as a hand mixer, a low blender setting, or for potato mashing and potato ricing.

Figure 8:
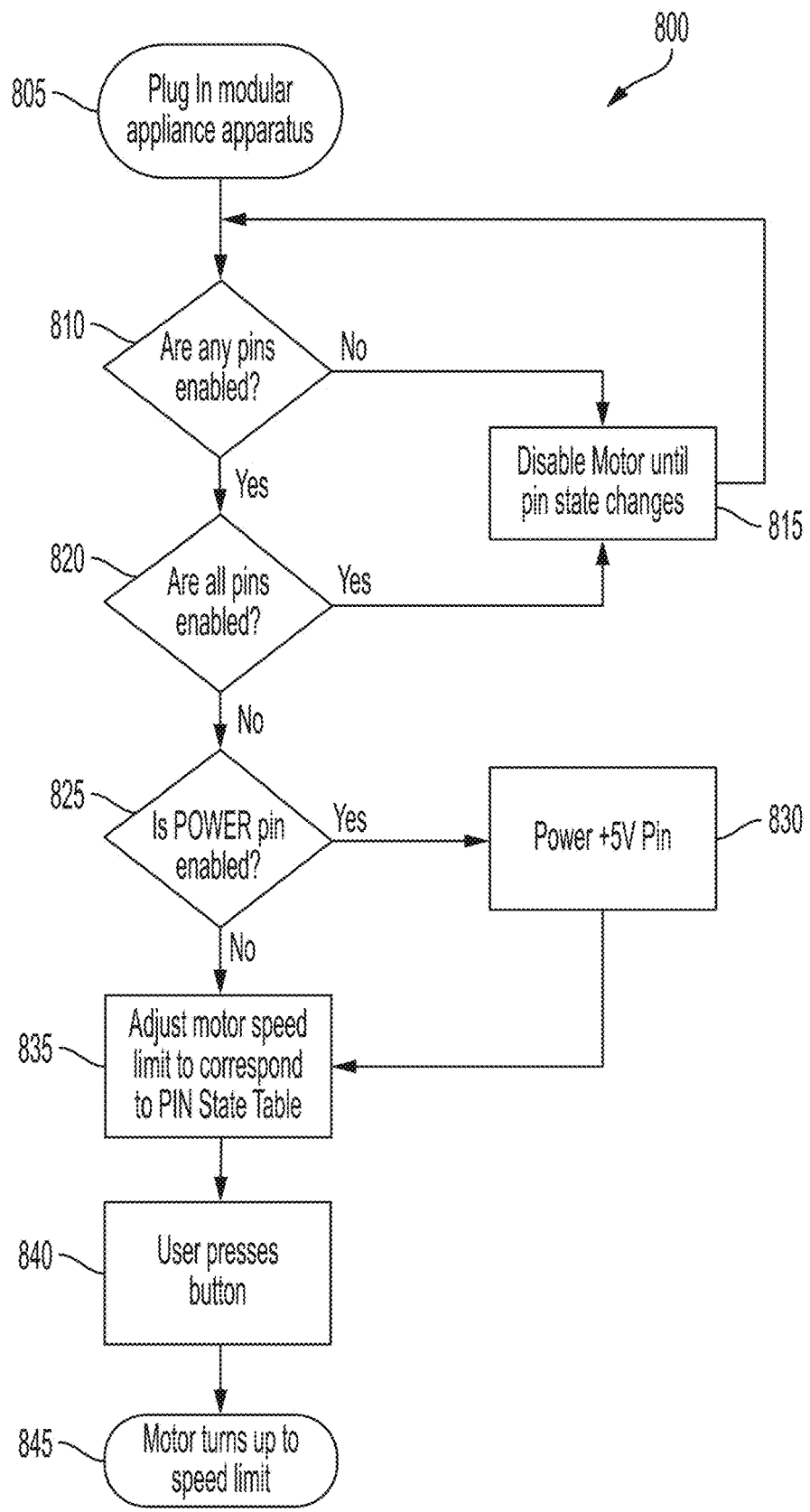
FIG. 8 shows a flowchart for digital motor control of the modular appliance apparatus in accordance with an embodiment of the disclosure.

An example of the control flow chart 800 for the digital motor control is shown in FIG. 8. The example given in FIG. 8 starts with plugging in the modular appliance apparatus 100 at step 805. Plugging in the modular appliance apparatus 100 in this sense means mating and securing the modular appliance apparatus 100 with the attachment 405 to connect the plurality of base contacts 200 to the plurality of attachment contacts 400 on the attachment 405. Once the attachment 405 is attached, the controller 710 queries and receives whether any of the pins are enabled at step 810. If no pins are enabled, the controller 710 registers a reading of the "0000" state 505. According to the reference table 500 in FIG. 5, the motor will be set to MOTOR OFF. At this point, in step 815, the motor is disabled until the pin state changes. If at least one pin is enabled, the controller 710 then queries and receives whether all of the pins are enabled at step 820. If all of the pins are enabled, a controller registers a reading of the "1111" state 580. According to the reference table 500 in FIG. 5, the motor will be set to MOTOR OFF, and the motor is disabled until the pin state changes. If at least one, but fewer than all of the pins are enabled, the controller queries and receives whether the power pin 720 is enabled at step 825. If the power pin 720 is enabled, power is passed through the modular appliance apparatus 100 to the attachment 405 to possible power various components of the attachment 405 at step 830. If the power pin 720 is not enabled, or if the power pin 720 is enabled with power flowing through to the attachment 405, the speed of the motor is adjusted to the corresponding speed based off of the reference table 500 in FIG. 5 as seen in step 835. Next, the user pushes the mechanical switch 130 at step 840 and the motor runs at the programmed speed for the attachment 405 at step 845.

Figure 9:
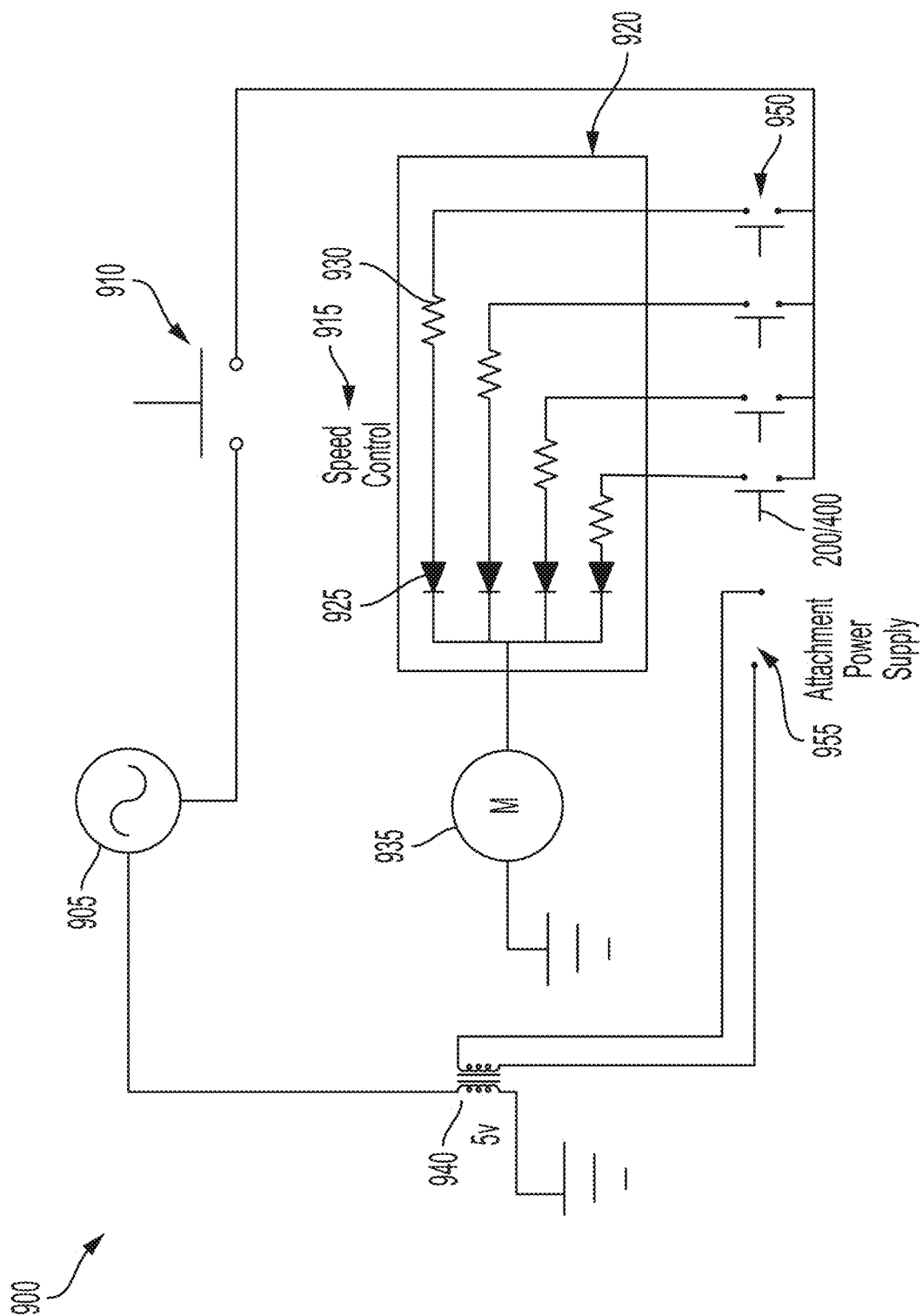
FIG. 9 shows an electrical schematic of circuitry within the modular appliance apparatus for attachment-driven motor speed control with use of static resistors in accordance with an embodiment of the disclosure.

An example of an analog control system 900 for the modular appliance apparatus 100 with static resistors is shown in FIG. 9. Unlike the digital control system, the analog control system accomplishes motor speed control 915 by a plurality of diodes 925 and static resistors 930. Depending on the attachment contacts 400, mating with the base contacts 200 creates the completed circuitry to output the speed control to motor 935. Base contacts 200 work with attachment contacts 400 to create a set of switches 950. Each switch 950 is formed by the pairing of the respective base contact 200 with the attachment contact 400. When connected, current is allowed to flow through each the static resistor 930 and the diode 925 of the representative path and provide a current output to the motor varying from the amount of connections activated a specific instance. The motor 935 will then output the correct speed to the drive mechanism 205 based on the received current. The power source 905 may provide AC power or DC power dependent on the other components of the electronic circuitry. A trigger switch 910 is also present. The trigger switch 910 is activated by the user pressing the mechanical switch 130 on the housing 105 of the modular appliance apparatus 100 thereby connecting the circuit to allow a power to pass into the speed control 915. In this analog embodiment, the trigger switch 910 may be connected to a ground pin of the base contacts 200 that is no longer being used for grounding. The ground pin would then mate with a corresponding attachment contact 400 to power to pass through the attachment 405 and then back into the speed control 915 based on the other contact combinations in place between the base and attachment contacts 200 and 400.

Additionally, passing power to the attachment 405 is accomplished in a different way with the analog circuitry design. A transformer 940 is provided power by the power source 905. The output of transformer 940 can then pass power to the attachment power supply 955 if there is a connection between the representative base contact 200 and the attachment contact 400 of the attachment 405. In this manner, power is provided to the attachment 405.

Figure 10:
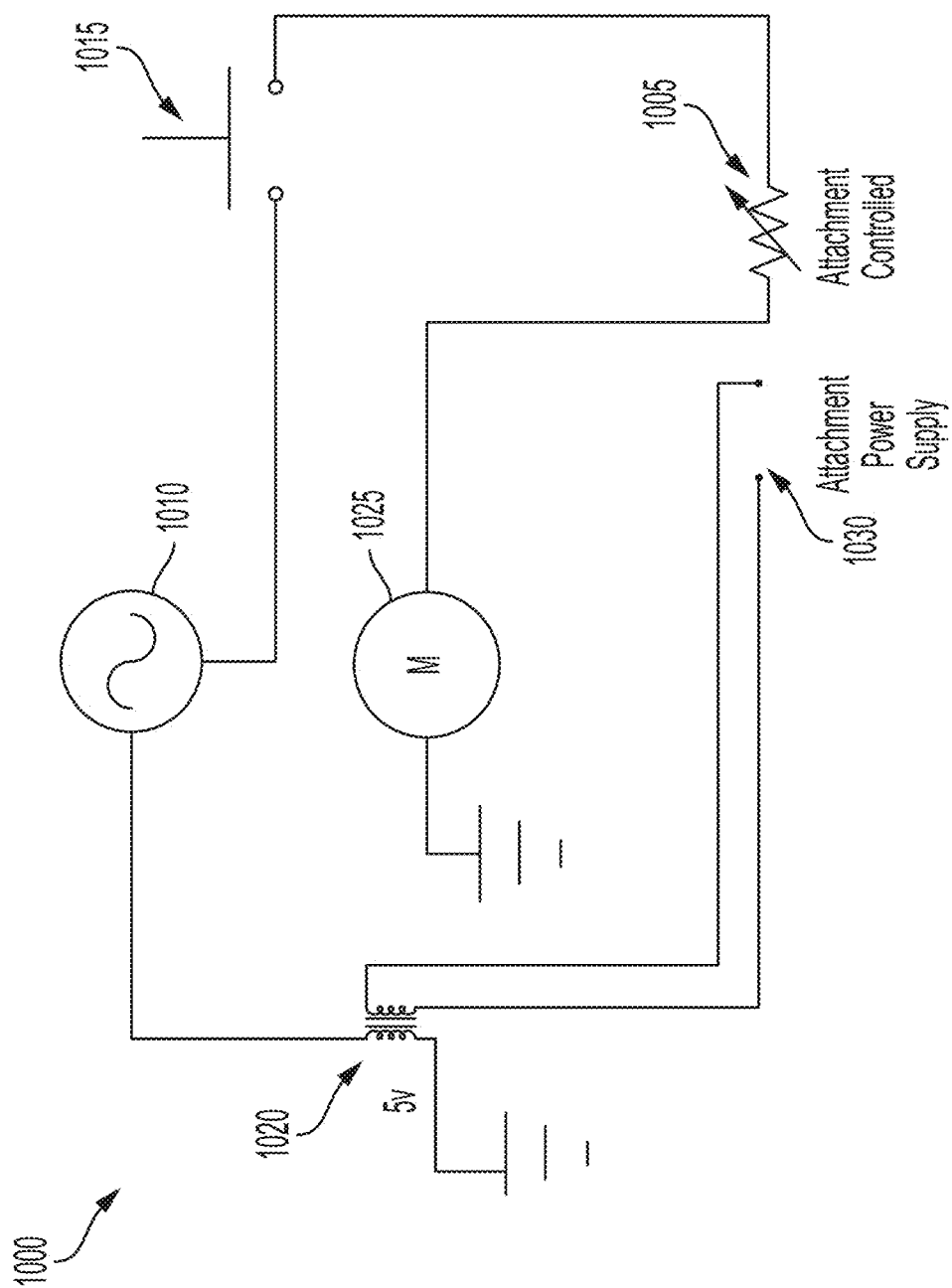
FIG. 10 shows an electrical schematic of circuitry within the modular appliance apparatus for attachment-driven motor speed control with use of a variable resistor in accordance with an embodiment of the disclosure.

An example of an alternate analog control system 1000 with variable resistors for an attachment 405 is given in FIG. 10. Unlike FIG. 9, which utilizes multiple static resistors 920, FIG. 10 uses a variable resistor 1005 configured to change the resistance value based on the number of contacts connections between the plurality of base contacts 200 and the plurality of attachment contacts 400. Depending on the number of contact connections, the variable resistor 1005 will output an adjusted current to the motor 1025 for operation of the modular appliance apparatus 100. This variable resistor 1005 will equal the set value of resistance from the different combinations of contact points between the plurality of base contacts 200 and the plurality of attachment contacts 400 being activated as shown in FIG. 9. Each attachment 405 will have a different combination of contact points being activated and each combination will have an outputted current flow based on the variable resistance going into the motor 1025. In this alternate analog circuitry, the variable resistor 1005 will act as the speed control for the motor 1025. FIG. 10 starts with power supply 1010. The power supply 1010 may provide AC power or DC power dependent on the other components of the electronic circuitry. A trigger switch 1015 is also present. The trigger switch 910 is activated by the user pressing the mechanical switch 130 on the housing 105 of the modular appliance apparatus 100 thereby connecting the circuit to allow a power to pass into the variable resistor 1005. FIG. 10 shows the trigger switch 1015 in an "off" position. At this position, the circuit is not fully connected and no power is being transferred from the power supply 1010 to the variable resistor 1005. At this state, the motor will not run. In this analog embodiment, the trigger switch 1015 may be connected to a ground pin of the base contacts 200 that is no longer being used for grounding. The ground pin would then mate with a corresponding attachment contact 400 to pass power through the attachment 405 and then back into the variable resistor 1005 based on the other contact combinations in place between the base and attachment contacts 200 and 400.

Additionally, passing power to the attachment 405 is accomplished in a different way with the alternate analog circuitry design. A transformer 1020 is provided power by the power source 1010. The output of transformer 1020 can then pass power to the attachment power supply 1030 if there is a connection between the representative base contact 200 and the attachment contact 400 of the attachment 405. In this manner, power is provided to the attachment 405.

Figure 11:
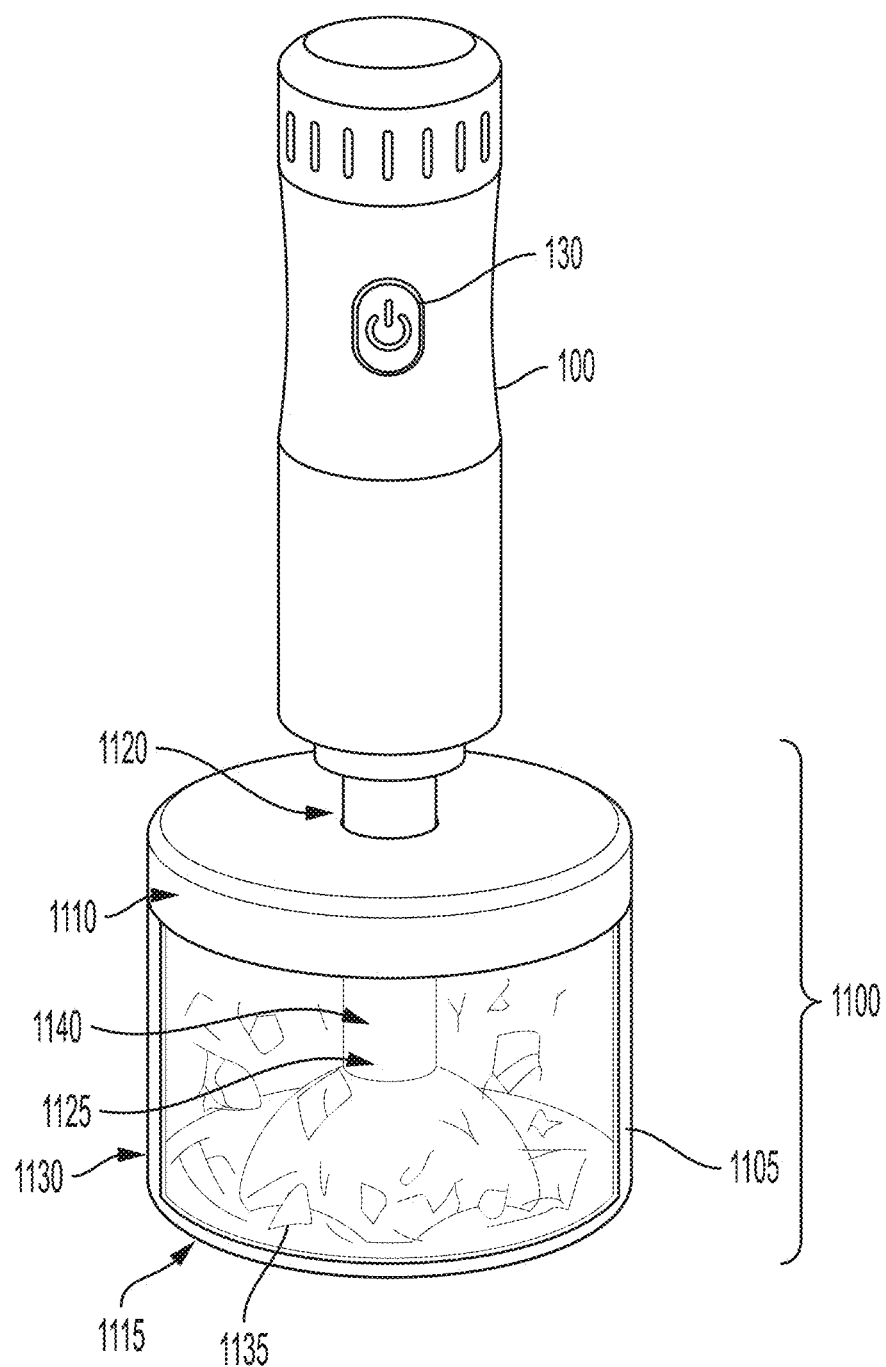
FIG. 11 illustrates an example of the modular appliance apparatus connected to an attachment that is a nut chopper in accordance with an embodiment of the disclosure.

FIG. 11 illustrates an example embodiment of an attachment for the modular appliance apparatus 100. The example embodiment shown in FIG. 11 is a nut chopper 1100. The nut chopper 1100 in FIG. 11 has a housing 1105. The housing 1105 in FIG. 11 includes of a top end 1110 and a bottom end 1115. The top end 1110 of the housing 1105 has a hole 1120 large enough to fit a rotating blade 1125. The top end 1110 and the bottom end 1115 of the housing 1105 are connected by a boundary 1130. The boundary 1130 serves to create a bounded region to contain the nuts and to prevent the nuts at all stages of the chopping function from escaping outside of the contained area. The boundary 1130 also ensures that the nuts are kept within reach of the blade 1125 so they may be repeatedly chopped until they reach the desired size rather than scatter after the initial chopping. The boundary 1130 shown in FIG. 11 is circular but the boundary can be any shape. The boundary 1130 shown in FIG. 11 is transparent, but the boundary is not limited only to transparent boundaries. In fact, the boundary 1130 may be made from a variety of materials including, but not limited to, plastic or glass.

The nut chopper 1100 shown in FIG. 11 has a nut chopping rotating blade 1125. The rotating blade 1125 has a plurality of cutting edges 1135 located at the bottom end of the rotating blade 1125, and a blade shaft 1140 extending upward from the plurality of cutting edges 1135. The blade shaft 1140 fits through the hole 1120 on the top end 1110 of the nut chopper housing 1105. The rotating blade 1125 shown in FIG. 11 does not show the number of cutting edges 1135, but the rotating blade 1125 is not limited to any number of cutting edges.

At the top end of the housing 1105, a plurality of attachment contacts may be present (not shown). These attachment contacts mate with the plurality of base contacts 200 on the modular appliance apparatus 100 to complete the circuitry of the modular appliance apparatus 100. The top end of the housing 1105 may also have a drive coupling (not shown). Within this drive coupling, the drive mechanism 205 of the modular appliance apparatus 100 may attach to and operationally drive the attached nut chopper 1100.

The nut chopper 1100 may be operated by connecting the plurality of attachment contacts 400 to the plurality of base contacts 200, slotting the drive mechanism 205 into the drive coupling, and engaging the mechanical switch 130. Creating the contact connections and slotting the drive mechanism 205 into the drive coupling may occur simultaneously and be accomplished by the same action, though the connections may also be accomplished through independent actions. Once the nut chopper 1100 has been attached to the modular appliance apparatus 100 and the mechanical switch 130 engaged, the motor will spin up to the speed selected via one of the above described methods and nuts may be chopped within the housing 1105.

Figure 12:
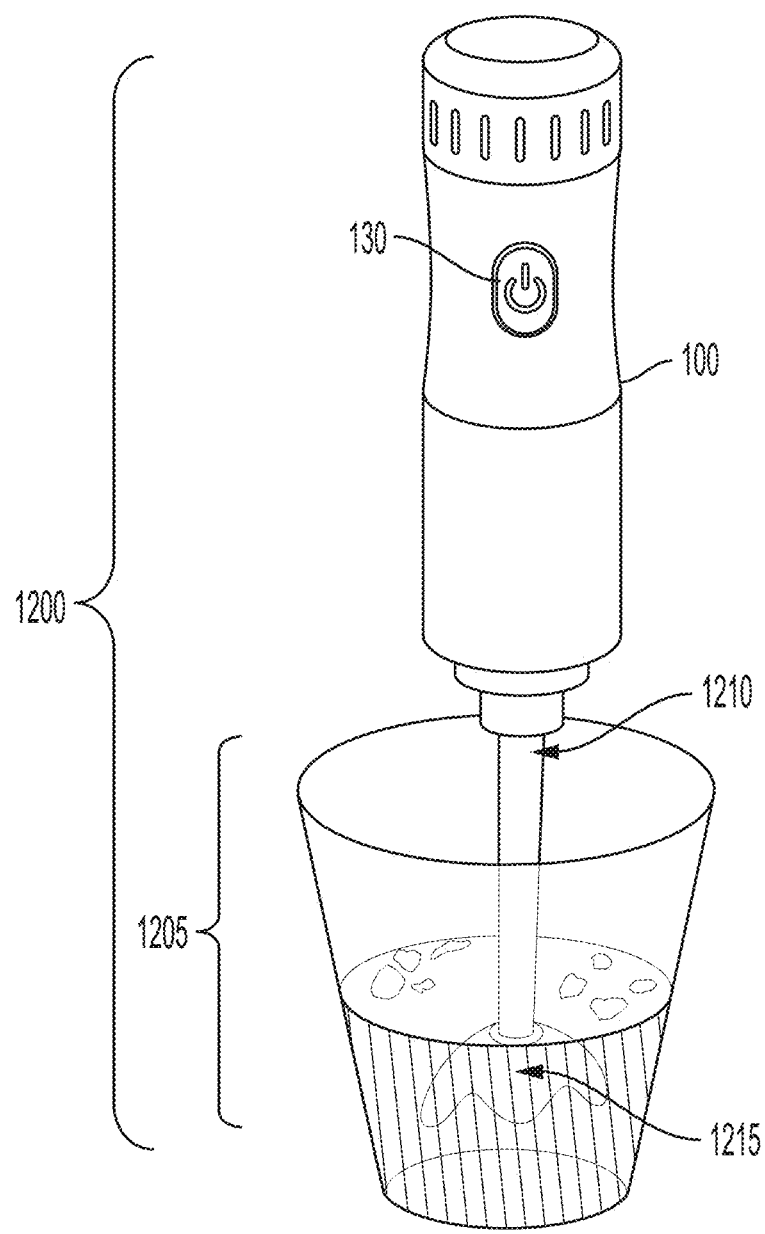
FIG. 12 illustrates an example of another attachment connected to the modular appliance apparatus that is an immersion blender in accordance with an embodiment of the disclosure.

FIG. 12 illustrates an example embodiment of an attachment for the modular appliance apparatus 100. The example embodiment shown in FIG. 12 is an immersion blender

1200. The immersion blender 1200 consists of a rotating blade 1205. The rotating blade 1205 consists of a top section 1210 and a bottom section 1215. The top section 1210 comprises a shaft, and the bottom section 1215 comprises a plurality of cutting edges. The rotating blade 1205 in FIG. 12 does not show the number of cutting edges, but the rotating blade 1205 is not limited to any number of cutting edges. The rotating blade 1205 may be made from various materials including, without limitation, plastic or metal. Like previous embodiments, a plurality of attachment contacts (not shown) and a drive coupling (not shown) may be located on the rotating blade 1205 to fit and mate with the modular appliance apparatus 100 to allow operation of the immersion blender.

The immersion blender 1200 may be operated by connecting the plurality of attachment contacts 400 to the plurality of base contacts 200, slotting the drive mechanism 205 into the drive coupling, and engaging the mechanical switch 130. Creating the contact connections and slotting the drive mechanism 205 into the drive coupling may occur simultaneously and be accomplished by the same action, though the connections may also be accomplished through independent actions. Once the immersion blender 1200 has been attached to the modular appliance apparatus 100 and the mechanical switch 130 engaged, the motor will spin up to the speed selected via one of the above described methods and various items may be blended.

Figure 13:
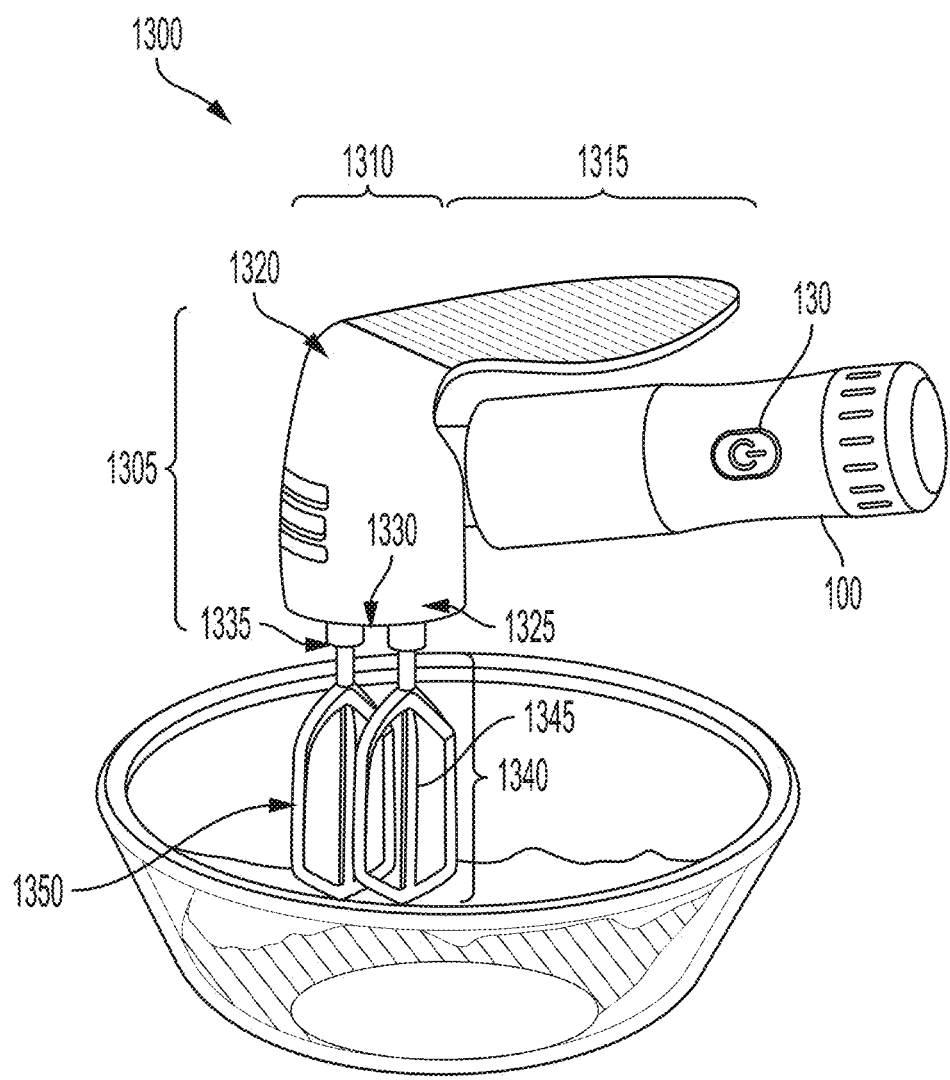
FIG. 13 illustrates an example of yet another attachment connected to the modular appliance apparatus that is a mixer in accordance with an embodiment of the disclosure.

FIG. 13 illustrates an example embodiment of an attachment for the modular appliance apparatus 100. The example embodiment shown in FIG. 13 is a mixer 1300. The mixer 1300 shown in FIG. 13 comprises a housing 1305. The housing 1305 of the mixer 1300 contains a main body 1310 and a handle 1315. The main body 1310 of the housing 1305 comprises a top end 1320, a bottom end 1325, and a cylindrical base 1330. The top end 1320 of the main body 1310 is connected to the handle 1315 of the housing 1305. The bottom end 1325 of the main body 1310 has protrusion points 1335. The protrusion points 1335 contain the mechanical mixing blades 1340. FIG. 13 shows two protrusion points 1335 containing two mixing blades 1340, but the main body 1310 of the housing 1305 is not limited to two protrusion points 1335 containing two mixing blades 1340.

In the pictured embodiment, the mixing blades 1340 each include a shaft 1345 and three mixing sub-blades 1350 that rotate around the shaft 1345. The mixing blades 1340 are not limited to three mixing sub-blades 1350 and may have more or less. In other embodiments, however, the mixing blades may take other forms. For example, and without limitation, the mixing blades may be large whisks or dough hooks. The mixing blades 1340 may be constructed from various materials including, but not limited to, plastic or metal. The cylindrical base 1330 of the housing 1305 is the central part of the housing 1305. The cylindrical base 1330 is connected to the handle 1315, the modular appliance apparatus 100, and the protrusion points 1335 at different locations. The handle 1315 of the housing 1305 of the mixer 1300 in FIG. 13 is connected to the main body 1310 of the housing 1305 at the top end 1320 of the main body 1310. The handle 1315 extends outwards from the main body 1310 and contains a curved surface design for gripping. Like previous embodiments, a plurality of attachment contacts and a drive coupling (both of which are not shown) may be located on the attachment to fit and mate with the modular appliance apparatus 100 to allow operation of the mixer.

The mixer 1300 may be operated by connecting the plurality of attachment contacts 400 to the plurality of base contacts 200, slotting the drive mechanism 205 into the drive coupling, and engaging the mechanical switch 130. Creating the contact connections and slotting the drive mechanism 205 into the drive coupling may occur simultaneously and be accomplished by the same action, though the connections may also be accomplished through independent actions. Once the mixer 1300 has been attached to the modular appliance apparatus 100 and the mechanical switch 130 engaged, the motor will spin up to the speed selected via one of the above described methods and various items may be mixed.

Figure 14:
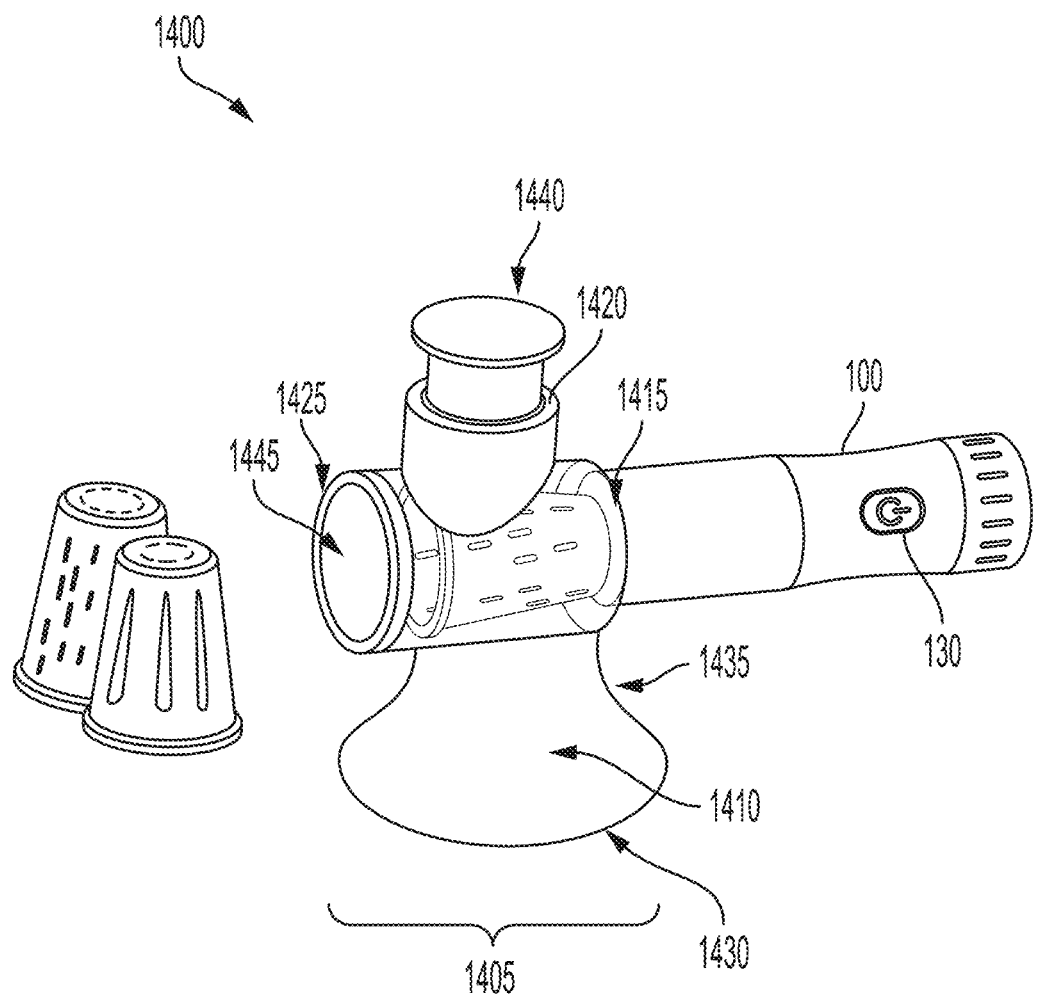
FIG. 14 illustrates an example of yet another attachment connected to the modular appliance apparatus that is a salad shredder in accordance with an embodiment of the disclosure.

FIG. 14 is an example embodiment of an attachment for the modular appliance apparatus 100. The example embodiment shown in FIG. 14 is a salad shredder 1400. The salad shredder shown in FIG. 14 comprises a housing 1405. The housing 1405 comprises a base end 1410, a connection point 1415 to the modular appliance apparatus 100, an insert opening 1420 and a shredding opening 1425. The base end 1410 of the housing 1405 comprises a flat bottom 1430 for support and a curved cylindrical siding 1435. The curved cylindrical siding 1435 connects to the shredding opening 1425 section of the housing 1405 at the top end of the base end 1410. The connection point 1415 to the modular appliance apparatus 100 comprises a cylindrical ring. The cylindrical ring contains a mechanical connection point to the modular appliance apparatus 100. The insert opening 1420 comprises a circular opening at the top of the housing 1405. The insert opening 1420 is not limited to a circular shape and can be any shape. The insert opening 1420 is designed to fit a pushing apparatus 1440 that will push a desired object into the shredding opening 1425. The shredding opening 1425 contains the rotating salad shredder 1445. The rotating salad shredder 1445 rotates at the speed supplied by the modular variable speed appliance in order to shred the salad. The shredded salad then exits a circular opening in the shredding opening 1425. Like previous embodiments, a plurality of attachment contacts and a drive coupling (both of which are not shown) may be located on the attachment to fit and mate with the modular appliance apparatus 100 to allow operation of the salad shredder 1400.

The salad shredder 1400 may be operated by connecting the plurality of attachment contacts 400 to the plurality of base contacts 200, slotting the drive mechanism 205 into the drive coupling, and engaging the mechanical switch 130. Creating the contact connections and slotting the drive mechanism 205 into the drive coupling may occur simultaneously and be accomplished by the same action, though the connections may also be accomplished through independent actions. Once the salad shredder 1400 has been attached to the modular appliance apparatus 100 and the mechanical switch 130 engaged, the motor will spin up to the speed selected via one of the above described methods and salad may be shredded.

Figure 15:
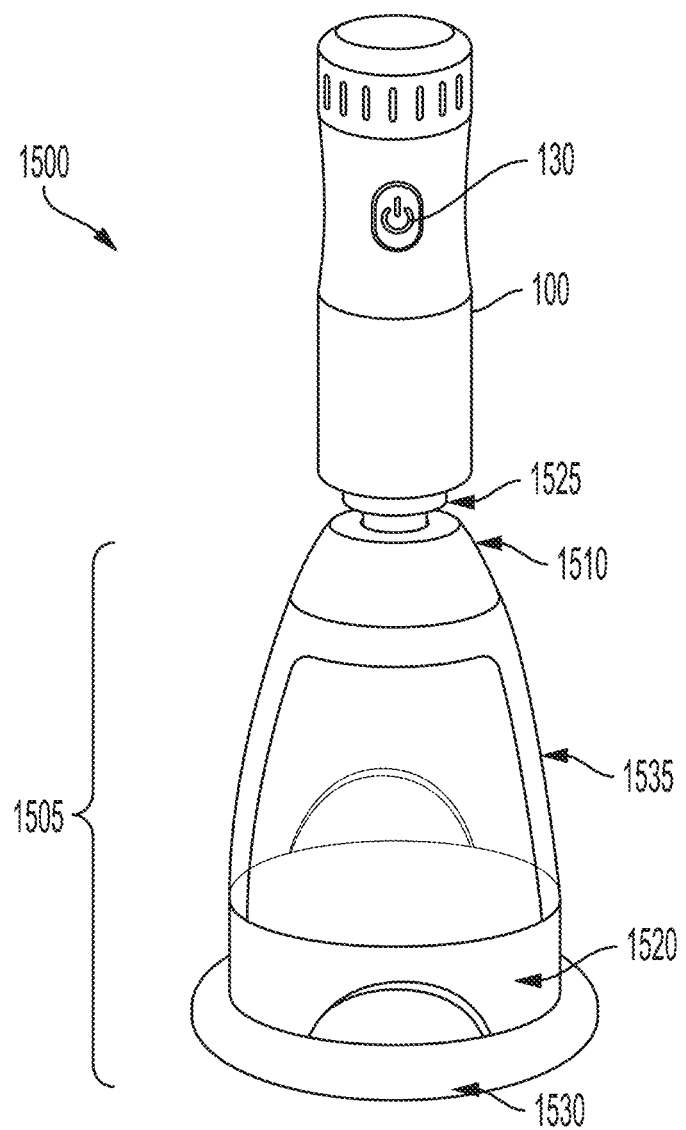
FIG. 15 illustrates an example of yet another attachment connected to the modular appliance apparatus that is a spiralizer in accordance with an embodiment of the disclosure.

FIG. 15 is an example embodiment of an attachment for the modular appliance apparatus 100. The example embodiment shown in FIG. 15 is a spiralizer 1500. The spiralizer 1500 shown in FIG. 15 comprises a housing 1505. The housing 1505 comprises a top end 1510 and a bottom end 1520. The top end 1510 of the housing 1505 contains a mechanical connecting point 1525 to connect the spiralizer 1500 to the modular variable speed appliance. The bottom end 1520 of the housing 1505 comprises a flat surface for support 1530. The top end 1510 and the bottom end 1520 of the housing 1505 are connected by a main body 1535. The main body 1535 of the housing is curved along the outside. The upper end of the main body 1535 is the narrowest end of the main body 1535. The main body 1535 continually becomes a wider curve as the main body 1535 heads toward the bottom end 1520 of the housing 1505. The upper end of the housing 1505 contains a blade for spiralizing on the inside of the housing (not shown). The blade for spiralizing rotates once the motor is activated in the modular appliance apparatus 100. Like previous embodiments, a plurality of attachment contacts 400 and a drive coupling (both of which are not shown) may be located on the attachment to fit and mate with the modular appliance apparatus 100 to allow operation of the spiralizer 1500.

The spiralizer 1500 may be operated by connecting the plurality of attachment contacts 400 to the plurality of base contacts 200, slotting the drive mechanism 205 into the drive coupling, and engaging the mechanical switch 130. Creating the contact connections and slotting the drive mechanism 205 into the drive coupling may occur simultaneously and be accomplished by the same action, though the connections may also be accomplished through independent actions. Once the spiralizer 1500 has been attached to the modular appliance apparatus 100 and the mechanical switch 130 engaged, the motor will spin up to the speed selected via one of the above described methods and various food products may be spiralized.

Figure 16:
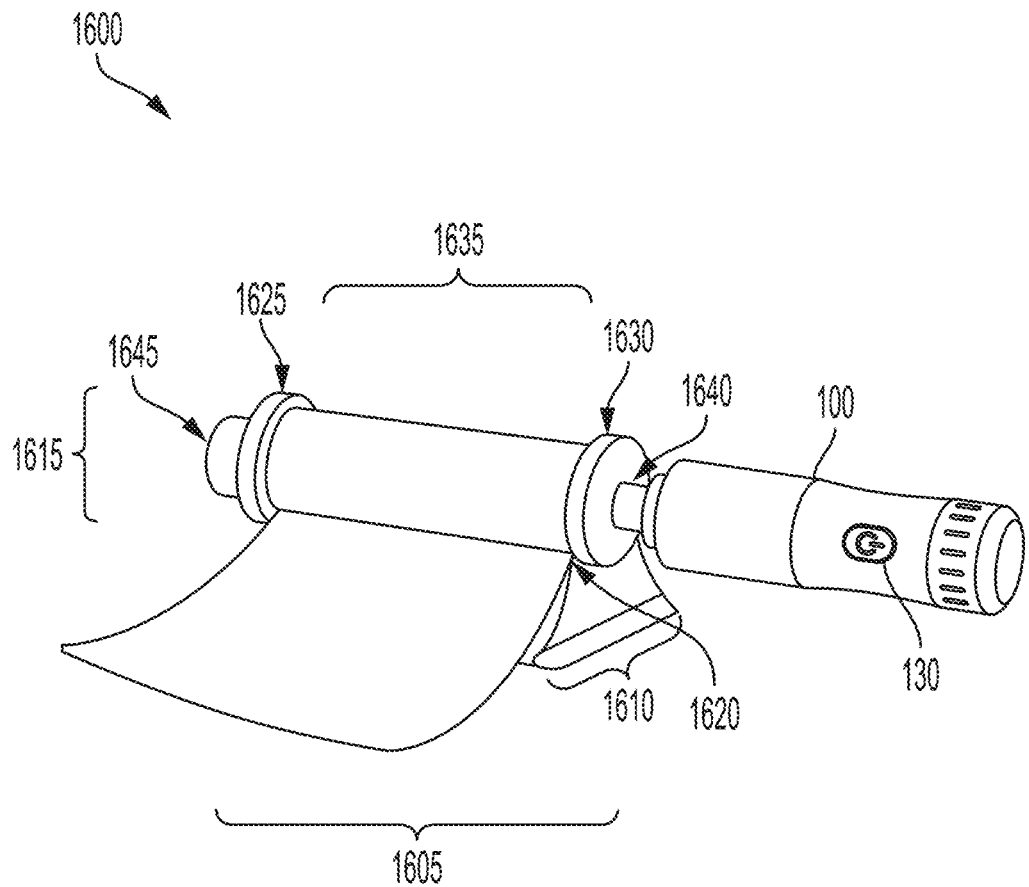
FIG. 16 illustrates an example of yet another attachment connected to the modular appliance apparatus that is a pasta maker in accordance with an embodiment of the disclosure.

FIG. 16 is an example embodiment of an attachment for the modular appliance apparatus 100. The example embodiment shown in FIG. 16 is a pasta maker 1600. The pasta maker 1600 shown in FIG. 16 comprises a housing 1605. The housing 1605 comprises a bottom section 1610 and a rotating upper section 1615. The bottom section 1610 is a support section and is flat at the bottom. The sides of the support section flow upwards to the bottom of the rotating upper section 1615 where the bottom section 1610 connects to the upper section 1615. At the connection point, there is a slight blade 1620 that extrudes the pasta as it is rolled through the rotating upper section 1615. The upper section 1615 comprises a left end 1625 and a right end 1630. The left end 1625 and the right end 1630 are connected by the rotating main body cylinder 1635. One of the ends of the rotating upper section contains a mechanical connection point 1640 which connects the housing 1605 to the modular appliance apparatus 100. The other end of the rotating upper section comprises and end base 1645. The rotating main body cylinder 1635 which connects the two ends rotates when the motor from the modular appliance apparatus 100 is activated by the user. Pasta then extrudes through the slight blade 1620 while being feed via the rotating main body cylinder 1635. Like previous embodiments, a plurality of attachment contacts 400 and a drive coupling (both of which are not shown) may be located on the attachment to fit and mate with the modular appliance apparatus 100 to allow operation of the pasta maker 1600.

Figure 17:
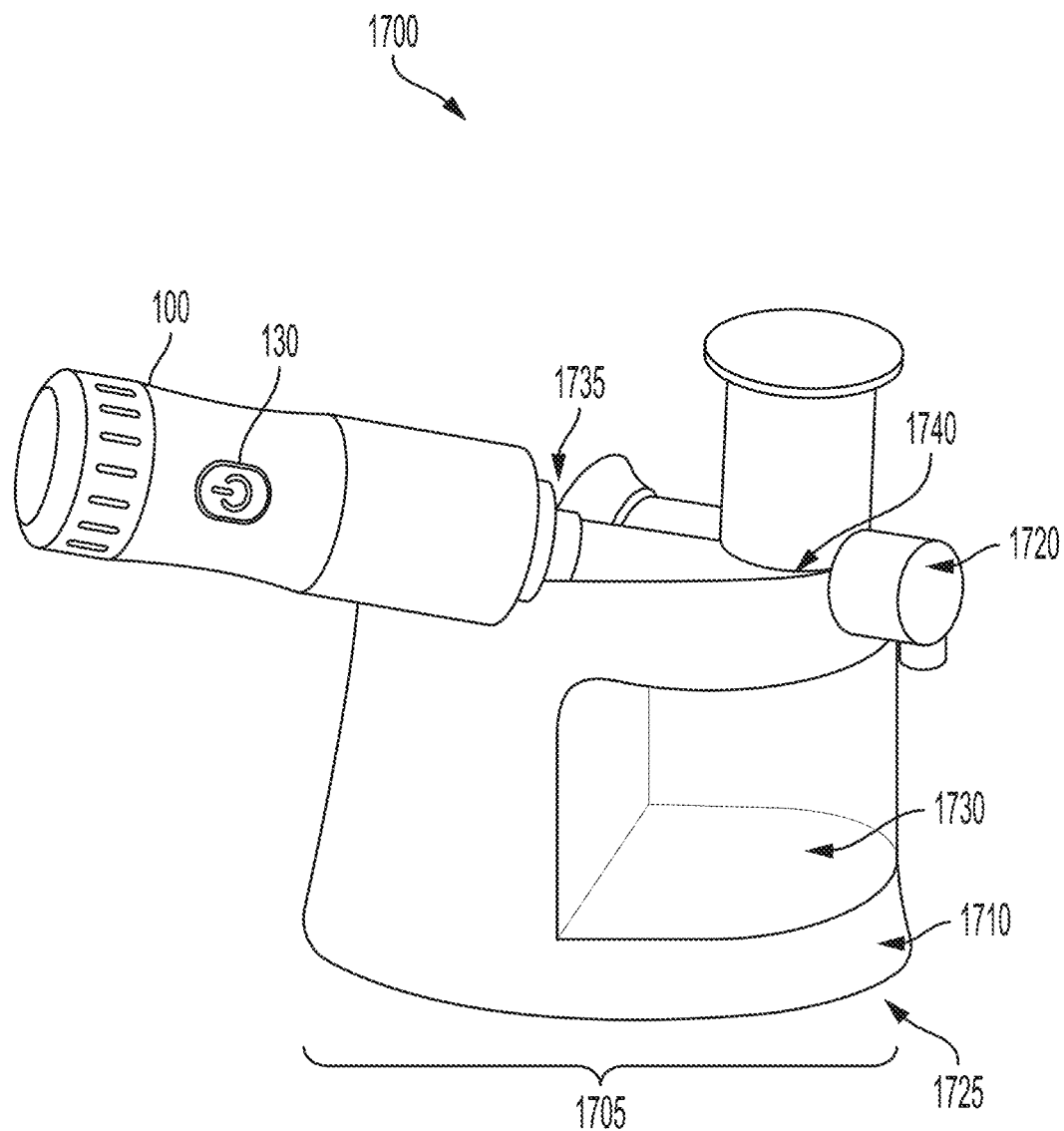
FIG. 17 illustrates an example of yet another attachment connected to the modular appliance apparatus that is a juicer in accordance with an embodiment of the disclosure.

FIG. 17 is an example embodiment of an attachment for the modular appliance apparatus 100. The example embodiment shown in FIG. 17 is a juicer 1700. The juicer is comprised of a housing 1705. The housing comprises a base 1710, a container for storing juice 1730, and a tap 1720. The housing base 1710 comprises a bottom for support 1725 and the container for storing juice 1730. The container for storing juice 1730 shown in the example embodiment is transparent, but the container for storing juice 1730 is not limited to a transparent material. The container for storing juice 1730 may be made from various materials including, without limitation, plastic or glass. The housing base 1710 also contains a mechanical connection point 1735 to the modular appliance apparatus 100. The mechanical connection point 1735 can extrude remains of the food products used by the juicer 1700. The chamber for juicing 1740 is located at the top end of the housing base. The chamber for juicing contains an opening for the foods which will be juiced. The tap 1720 of the juicer 1700 is located on the upper side of the housing base 1710. The tap 1720 allows for juice to be drained from the container for storing juice 1730 of the housing base 1710. Like previous embodiments, a plurality of attachment contacts 400 and a drive coupling (both of which are not shown) may be located on the attachment to fit and mate with the modular appliance apparatus 100 to allow operation of the juicer 1700.

The juicer 1700 may be operated by connecting the plurality of attachment contacts 400 to the plurality of base contacts 200, slotting the drive mechanism 205 into the drive coupling, and engaging the mechanical switch 130. Creating the contact connections and slotting the drive mechanism 205 into the drive coupling may occur simultaneously and be accomplished by the same action, though the connections may also be accomplished through independent actions. Once the juicer 1700 has been attached to the modular appliance apparatus 100 and the mechanical switch 130 engaged, the motor will spin up to the speed selected via one of the above described methods and various food products may be juiced.

The embodiments were chosen and described in order to best explain the principles of the invention and its practical application to thereby enable others skilled in the art to best utilize the invention in various embodiments and with various modifications as are suited to the particular use contemplated.

As various modifications could be made in the construction and method herein described and illustrated without departing from the scope of the invention, it is intended that all matter contained in the foregoing description or shown in the accompanying drawings shall be interpreted as illustrative rather than limiting. For example, design of the modular appliance apparatus, different attachments, and different electronic circuitry within the modular appliance apparatus may be employed but can achieve the same functionality of the underlying invention. Thus, the breadth and scope of the present invention should not be limited by any of the above-described example embodiments, but should be defined only in accordance with the following claims appended hereto and their equivalents.

What is claimed is:

1. A modular appliance apparatus comprising:
a housing having a top end and a bottom end;
a motor located within the housing;
a controller located within the housing and in electronic communication with the motor, the controller storing a plurality of operational speeds for the modular appliance apparatus;
a switch located on the housing and in communication with the controller, the switch having an on position and an off position;
a plurality of base contacts located on the bottom end of the housing;
a drive mechanism located on the bottom end of the housing and in mechanical communication with the motor;
an electronic circuit connecting the plurality of base contacts, the switch, the controller, and the motor;
a food preparation attachment configured to be removably affixed with the bottom end of the housing, the food preparation attachment having a plurality of attachment contacts contactable with the plurality of base contacts on the bottom end of the housing to form at least one electrical connection; and wherein the at least one electrical connection between the plurality of attachment contacts of the food preparation attachment and the plurality of base contacts of the bottom end of the housing operate the motor at a stored operational speed determined by the controller based on a number of electrical connections between the plurality of attachment contacts and the plurality of base contacts when the switch is actuated into the on position.

2. The modular appliance apparatus of claim 1, further comprising a power source.

3. The modular appliance apparatus of claim 2, wherein the power source is a battery located within the housing.

4. The modular appliance apparatus of claim 1, wherein the plurality of base contacts includes a ground contact, a power contact, and an at least one control contact.

5. The modular appliance apparatus of claim 4, wherein the at least one control contact creates at least one of the number of electrical connections with a corresponding attachment contact of the plurality of attachment contacts to operate the motor at the stored operational speed determined by the controller when the switch is actuated into the on position.

6. The modular appliance apparatus of claim 4, wherein the power contact provides a power signal to the food preparation attachment to drive powered components of the food preparation attachment.

7. The modular appliance apparatus of claim 1, wherein the controller contains a memory, the memory storing a reference table relating to a state of the plurality of base contacts and a speed legend relating to the plurality of operational speeds operable by the motor.

8. The modular appliance apparatus of claim 7, wherein the controller interprets the number of electrical connections between the plurality of attachment contacts and the plurality of base contacts to determine the state of the modular appliance apparatus, and wherein the controller, by access to the reference table and the speed legend, determines the stored operational speed of the state of the plurality of base contacts and transmits the stored operational speed to the motor.

9. The modular appliance apparatus of claim 7, wherein the controller transmits the stored operational speed to a motor control circuit for setting the motor to the select speed.

10. A modular appliance apparatus comprising:
a housing having a top end and a bottom end;
a motor located within the housing;
a power source located within the housing;
a controller located within the housing and in electronic communication with the motor, the controller storing a plurality of operational speeds for the modular appliance apparatus;
a switch located on the housing and in communication with the controller, the switch having an on position and an off position;
a plurality of base contacts located on the bottom end of the housing;
an electronic circuit connecting the plurality of base contacts, the switch, the power source, the controller, and the motor;
a food preparation attachment having a defined number of attachment contacts contactable with the plurality of base contacts on the bottom end of the housing to form at least one electrical connection, the food preparation attachment configured to be removably affixed with the bottom end of the housing;
wherein removably affixing the food preparation attachment to the bottom end of the housing connects the defined number of attachment contacts with the of base contacts to create a number of electrical connections between the defined number of attachment contacts and the plurality of base contacts to complete the electronic circuit between the food preparation attachment, the plurality of base contacts, the switch, the controller, the motor, and the power source; and
wherein the number of electrical connections determine a stored operational speed for the modular appliance apparatus communicated from the controller to the motor when the modular appliance apparatus is in an operational state.

11. The modular appliance apparatus of claim 10, wherein the number of electrical connections between the defined number of attachment contacts and the plurality of base contacts operates the motor at the stored operational speed determined by the controller when the switch is actuated into the on position.

12. The modular appliance apparatus of claim 10, further comprising a drive mechanism located on the bottom end of the housing and a drive coupling on the food preparation attachment, the drive mechanism and drive coupling mechanically coupled when the food preparation attachment is secured to the bottom end of the housing.

13. The modular appliance apparatus of claim 10, wherein the power source is a battery located within the housing.

14. The modular appliance apparatus of claim 10, wherein the plurality of base contacts includes a ground contact, a power contact, and an at least one control contact.

15. The modular appliance apparatus of claim 14, wherein the at least one control contact creates at least one of the number of electrical connections with the defined number of attachment contacts to operate the motor at the stored operational speed determined by the controller when the switch is actuated into the on position.

16. The modular appliance apparatus of claim 14, wherein the power contact provides a power signal to the food preparation attachment to drive powered components of the food preparation attachment.

17. The modular appliance apparatus of claim 10, wherein the controller is a microprocessor having a memory, the memory storing a reference table relating to an operational state of the plurality of base contacts and a speed legend relating to the plurality of operational speeds operable by the motor.

18. The modular appliance apparatus of claim 17, wherein the microprocessor interprets the number of electrical connections between the plurality of base contacts and the defined number of attachment contacts to determine the operational state of the modular appliance apparatus, and wherein the microprocessor, by access to the reference table and the speed legend, determines the stored operational speed of the operational state and transmits the stored operational speed to the motor.

19. The modular appliance apparatus of claim 10, wherein the food preparation attachment is one of a nut chopper attachment, an immersion blender attachment, a mixer attachment, a salad shredder attachment, a spiralizer attachment, a pasta maker attachment, or a juicer attachment.

20. The modular appliance apparatus of claim 1, wherein the at least one control contact of the plurality of base contacts is a plurality of control contacts.

* * * * *